United States Patent [19]
Moiroux et al.

[11] Patent Number: 5,167,292
[45] Date of Patent: Dec. 1, 1992

[54] MOTIVE POWER UNIT FOR DRIVING A HYDROSTATIC TRANSMISSION COUPLED TO AN INTERNAL COMBUSTION ENGINE

[76] Inventors: Auguste Moiroux, 28 Avenue Guy de Collongue, 69131 Ecully; Francois Bernard, 105 Cours du Docteur Long, 69003 Lyons; Pierre Chavy, 10 rue Mesnil, 75116 Paris, all of France

[21] Appl. No.: 566,353

[22] PCT Filed: Mar. 24, 1989

[86] PCT No.: PCT/FR89/00141
§ 371 Date: Aug. 22, 1990
§ 102(e) Date: Aug. 22, 1990

[87] PCT Pub. No.: WO89/09144
PCT Pub. Date: Oct. 5, 1989

[30] Foreign Application Priority Data
Mar. 25, 1988 [FR] France ................... 88 0394

[51] Int. Cl.[5] .................. B60K 9/00; F04B 49/00
[52] U.S. Cl. ........................... 180/165; 60/415;
138/31; 180/242; 180/302; 180/305; 180/307;
180/308
[58] Field of Search ............... 180/165, 302, 305, 306,
180/307, 308, 242; 60/415, 414; 138/30, 31

[56] References Cited
U.S. PATENT DOCUMENTS

| | | | |
|---|---|---|---|
| 3,302,741 | 2/1967 | Brazuk | 180/305 |
| 3,344,879 | 10/1967 | Glomb et al. | 180/305 |
| 4,382,484 | 5/1983 | Anderson et al. | 180/165 |
| 4,478,304 | 10/1984 | Delano | 180/165 |
| 4,596,119 | 6/1986 | Johnson | 180/302 |
| 4,819,697 | 4/1989 | Randa et al. | 138/31 |
| 4,888,949 | 12/1989 | Rogers | 180/165 |
| 4,891,941 | 1/1989 | Heintz | 180/165 |
| 4,986,383 | 1/1991 | Evans | 180/165 |

FOREIGN PATENT DOCUMENTS

| | | | |
|---|---|---|---|
| 2119905 | 11/1983 | United Kingdom | 180/307 |
| 8909144 | 10/1989 | World Int. Prop. O. | 180/307 |

Primary Examiner—Mitchell J. Hill
Attorney, Agent, or Firm—Longacre & White

[57] ABSTRACT

Motive power unit comprising an internal combustion engine associated with a hydrostatic transmission, in particular for fitting to an automobile vehicle.

In accordance with the invention, the motive power unit comprises an internal combustion engine (60) mechanically coupled to a hydrostatic transmission device comprising at least one pump (12) with a piston (13) driven by said engine and an elastic accumulator coupled to the or each pump; the pumps being connected to a volumetric motor (14).

33 Claims, 7 Drawing Sheets

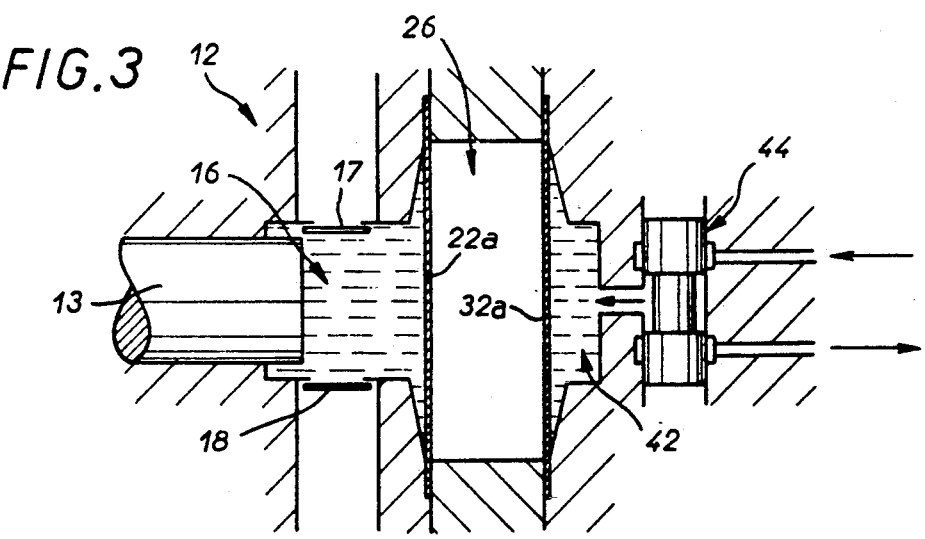
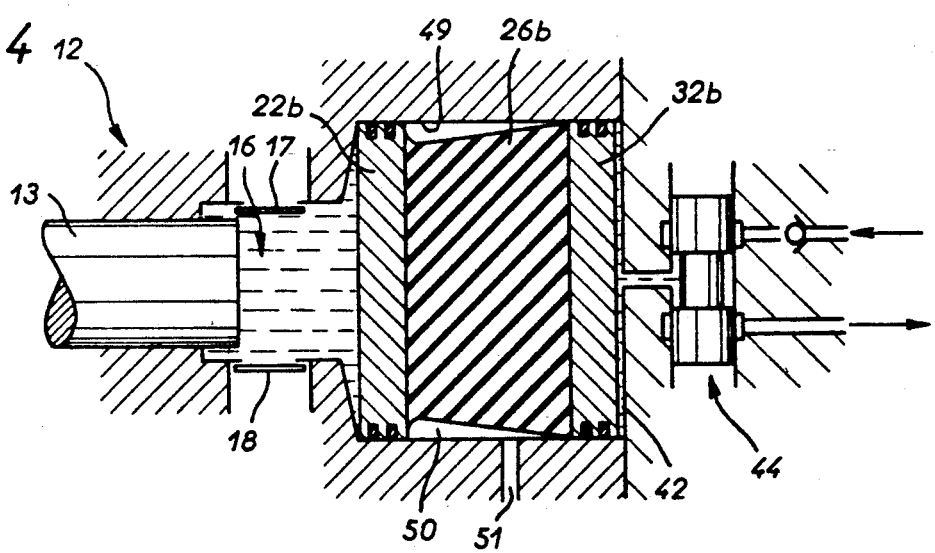
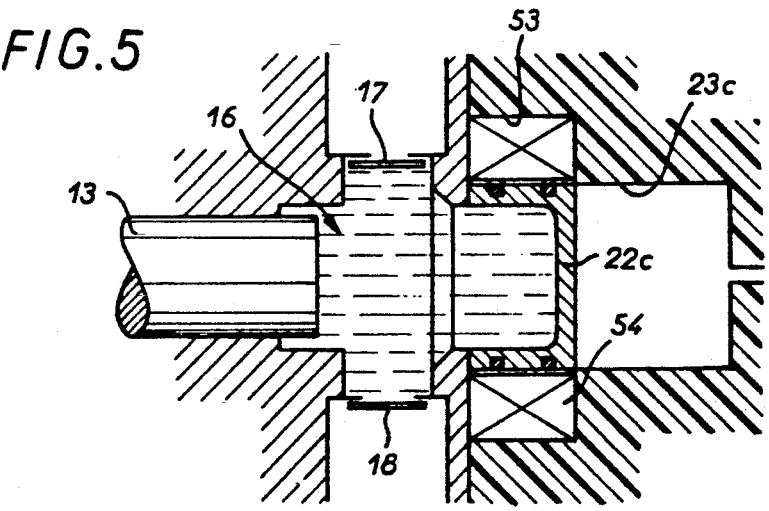

MOTIVE POWER UNIT FOR DRIVING A HYDROSTATIC TRANSMISSION COUPLED TO AN INTERNAL COMBUSTION ENGINE

BACKGROUND OF THE INVENTION

1. Field of the Invention

The invention relates to a motive power unit, in particular for automobile vehicles, and is more particularly concerned with a motive power unit of this kind equipped with a hydrostatic transmission device.

2. Description of the Related Art

A conventional hydrostatic transmission device usually comprises at least one pump feeding a liquid, usually oil, into a volumetric hydraulic motor. The piston of the pump can be operated by a heat engine, usually an internal combustion engine. EP disclosure 0 044 252 discloses such an arrangement. In a system of this kind regulation means are provided for adapting the flowrate of one of the two subsystems if that of the other varies. This is achieved by changing its volumetric capacity, usually by varying the active stroke.

SUMMARY OF THE INVENTION

The invention is essentially concerned with a motive power unit combining an internal combustion engine and a specific hydrostatic transmission device.

In this line of thinking, the invention thus concerns a motive power unit, in particular for automobile vehicles, comprising an internal combustion engine, mechanically coupled to a hydrostatic transmission device comprising at least one piston of a pump driven by the internal combustion engine and a volumetric motor connected to be fed by said pump, characterised in that the compression chamber of the pump in which the piston moves contains or is in permanent communication with an elastic accumulator, and in that the latter comprises or is associated with means for adjusting its elasticity.

The elastic accumulator can with considerable advantage be disposed in alignment with the bore of the piston of the pump, that is to say in the body of the pump itself.

Numerous structurally different variants are feasible for implementing said elastic accumulator. In particular, the accumulator may exploit the elasticity of a gas trapped in a variable volume enclosure. It may equally well comprise a block of elastomer material. Use may also be made of the "elasticity" of a mobile assembly subjected to a magnetic field tending to stabilise it in a given position and in this way make use of a magnetically produced elastic return force on the mobile assembly whenever it is moved away from its stable position. Finally, for simple applications it would also be feasible to use a simple arrangement of mechanical springs bearing on a mobile wall of the compression chamber of the pump. For most embodiments the invention provides the facility to modify also the stiffness of the elastic accumulator. To be more precise, for a given machine the ranges of variation of the stiffness and the elastic calibration will be predetermined by structural characteristics.

Numerous advantages result in particular from the combination of a hydrostatic transmission device of this kind with a two-stroke engine with free travel piston(s).

Finally, the invention also concerns an automobile vehicle incorporating this type of motive power unit.

BRIEF DESCRIPTION OF THE DRAWINGS

The invention will be better understood and other advantages of it will emerge more clearly from the following description relating to several possible embodiments of a hydrostatic transmission device, of a motive power unit and of an automobile vehicle, given by way of example only and with reference to the appended drawings in which:

FIG. 3 is a schematic representation analogous to FIG. 1 of a further embodiment of pneumatic reaction hydrostatic transmission device;

FIG. 4 is a schematic representation of a still further embodiment using elastic reaction produced by an elastomer block;

FIG. 5 is a schematic representation of a still further embodiment using magnetic elastic reaction;

FIGS. 14a, 14b are detailed views showing a variant enabling the scavenging pump from FIGS. 7 and 9 to be dispensed with.

DESCRIPTION OF THE PREFERRED EMBODIMENT

Figure 1:
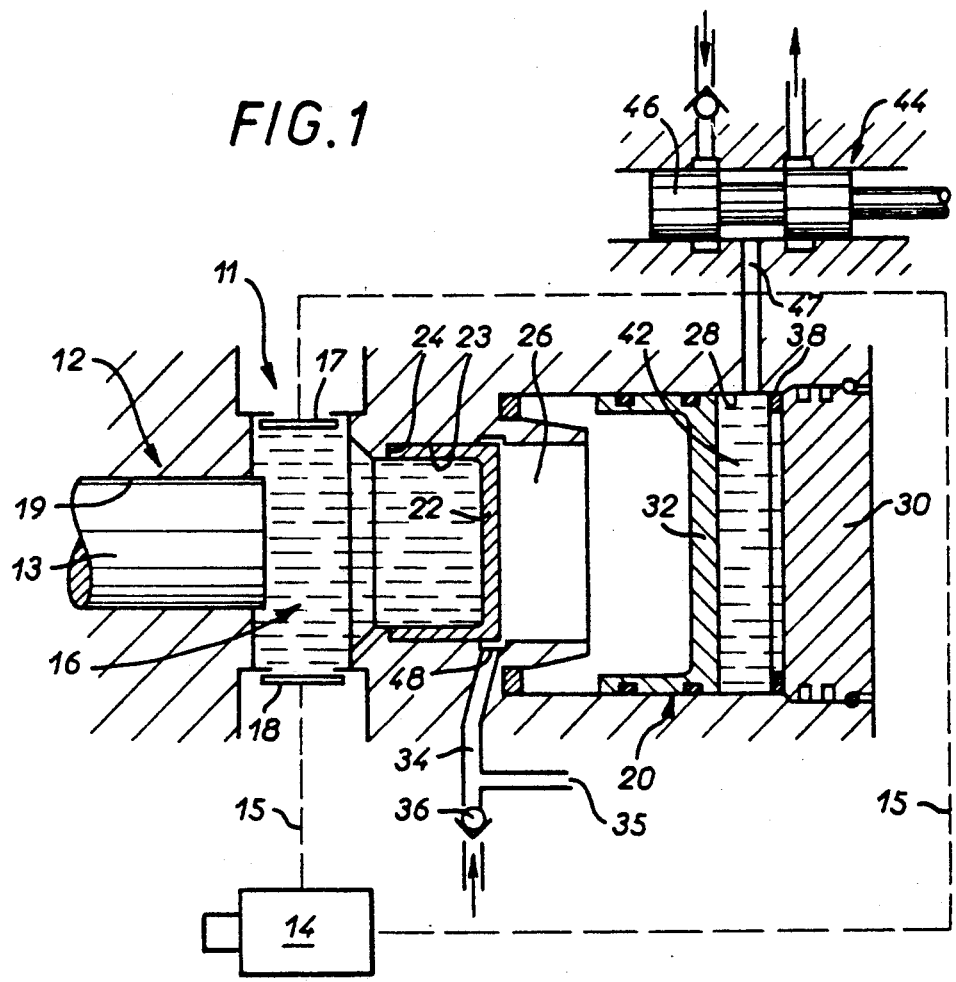
FIG. 1 is a schematic representation of a pneumatic elastic reaction hydrostatic transmission device.

Referring to FIG. 1, the hydrostatic transmission device 11 essentially comprises a pump 12 with a piston 13 and a volumetric motor 14 included in a hydraulic circuit 15 represented schematically in dashed outline to be fed by the pump. The fluid flowing in this circuit is usually oil. In more precise terms, the pump comprises a compression chamber 16 fitted with an inlet valve means 17 and an outlet valve means 18. The motor 14 is connected downstream of the outlet valve 18. The piston 13 moves in a bore 19 discharging into the compression chamber 16 and is reciprocated by means that are not shown in FIG. 1. In practice, this of course means a heat engine and in particular an internal combustion engine. The volumetric hydraulic motor 14 is of conventional design but has a simpler and more rugged construction because in the context of the invention it is preferably of the constant displacement type.

The compression chamber 16 of the pump contains or is in permanent communication with an elastic accumulator 20. The expression "permanent communication" means that such communication does not depend on whether any valve is open or closed, the elastic accumulator reacting directly to the pressure in the compression chamber 16. To this end the elastic accumulator 20 is coupled to a first mobile wall 22 forming part of the compression chamber of the pump, that is to say forming one wall of this chamber. In this instance, this is the wall facing and axially aligned with the piston 13. The wall 22 comprises a free piston moving in a bore 23 in the pump body, coaxially with the bore 19. This piston is urged towards a shoulder 24 by said elastic accumulator 20. The latter comprises a chamber 26 filled with a gas and also formed within the pump body, coaxially with the pistons 13 and 22. This chamber is defined within a bore 28 of larger diameter than the bore 23 and is axially delimited by the piston 22 and by a second mobile wall 32, in the form of a free piston sliding in the bore 28. In the bore 23 is a groove 48 that is only uncovered when the piston 22 is abutted against the shoulder 24. In this way the groove 48 is closed as soon as the piston 22 begins to move on each stroke and the gas contained in the chamber 26 is therefore immediately isolated. The nitrogen charge of the chamber 26 can therefore be "updated" on each cycle which entails a movement of the piston 22. If there are multiple pumps in parallel the charge of each chamber 26 is therefore strictly the same. The groove 48 communicates with a bore 34 provided with a non-return valve 36 through which the mass of gas can be topped up from time to time from an external source (not shown) to compensate for leaks. The bore 34 is in communication with the control device through the passage 35 (see below, FIG. 11). The pressurised gas in the chamber urges the piston 32 towards a shoulder 38. Also, the elastic accumulator 20 comprises or is associated with means for adjusting its elasticity. In this embodiment this is a variable volume chamber 42 filled with an incompressible fluid, normally oil. This chamber is separated from the elastic accumulator by the second mobile wall 32. In more precise terms, the variable volume chamber 42 is provided between the deformable part of the elastic accumulator, that is to say the chamber 26, and the fixed end wall 30 consisting, for example, of a plug fitted with annular seals closing off the bore 28. Control means 44 are provided to adjust the quantity of incompressible fluid in the chamber 42. In this embodiment the fluid is distributed by a control spool valve 46 the outlet of which communicates via a passage 47 bored into the upper part of the bore 28 in the vicinity of the extreme position of the piston 32 in which the piston is abutted against the shoulder 38.

The operation of the hydrostatic transmission device that has just been described is as follows: the fluid injected into the chamber 42 is the parameter that is varied to adjust the elasticity of the elastic accumulator 20. It is clear that the more the volume of the chamber 42 increases the higher is the calibration pressure of the gas trapped in the chamber 26. This pressure may be defined as the pressure exerted on the piston 22 by the elastic accumulator, that is to say by the chamber 42 filled with incompressible fluid.

As long as the pressure upstream of the hydraulic motor 14 is below the calibration pressure the first mobile wall 22 remains immobile, resting against the shoulder 24, and all of the flow from the pump is fed to the motor 14 via the valve 18. If the operating conditions of the motor are changed and its speed decreases, then the flowrate accepted by the motor decreases and the excess flow from the pump must remain in the chamber 16. The pressure therefore tends to increase. If this pressure exceeds the calibration pressure the elastic capacity 20 is compressed to enable the excess oil to be stored. The energy corresponding to this quantity of oil stored in the chamber 16 is therefore stored in the elastic capacity. It is returned on the next cycle. It will therefore be understood that the torque increases when the motor speed decreases, which is a particularly beneficial feature in numerous applications, and in particular for automobile traction. In this case, the torque will automatically increase in response to the slightest deceleration of the vehicle, for example if it starts to ascend a slope. In other words, as will be explained in more detail later, the very design of the system naturally introduces a law whereby the torque is inversely proportional to the speed of the hydraulic motor, for a given fuel setting of the engine driving the pump piston. To increase the charge it is sufficient to increase the calibration of the elastic accumulates, which prevents the storage of the fluid and directs it to the hydraulic motor. In this case the same regulation process occurs but at a higher pressure level.

Under limiting conditions of operation, that is to say if the motor 14 is stopped, the valve 18 does not open and all of the flow displaced by the piston of the pump 13 is absorbed by displacement of the first mobile wall or piston 22. The energy is entirely stored and once again returned to the piston on the next cycle. Naturally, a regulator (one example of which will be described later with reference to FIGS. 11A and 11B) operates on the adjustment means 40 to "relax" the elastic accumulator so that the energy interchanged under these conditions is as low as possible at idling speeds. It will therefore be understood that if the system is fitted to an automobile vehicle, the internal combustion engine can idle without the motor 14 running (vehicle stopped), the fuel consumption being minimised by virtue of the fact that the elastic accumulator is entirely "relaxed".

Figure 2:
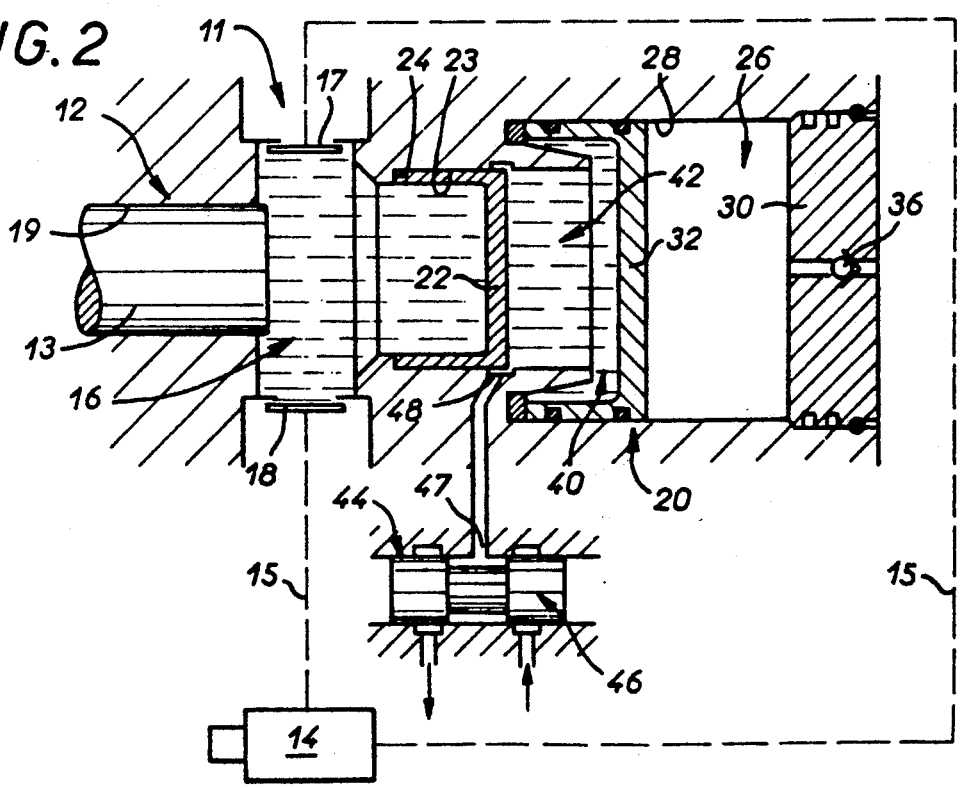
FIG. 2 is a schematic representation analogous to FIG. 1 of another embodiment of pneumatic reaction hydrostatic transmission device.

In the FIG. 2 embodiment analogous structural components carry the same reference numbers and will not all be described again in detail. This embodiment also uses a gas type elastic accumulator. It is distinguished from the previous one by the location of the variable volume chamber. In effect, the chambers 26 and 42 are interchanged, the variable volume chamber being delimited axially by the pistons 22 and 32. In other words, the variable volume chamber 42 is provided between the deformable part of the elastic accumulator 20 (that is to say the chamber 26) and the compression chamber of the pump. The same arrangement of the groove 48 coverable by the piston 22 is retained but in this embodiment groove 48 is connected to the control means 44 in such a way that the quantity of incompressible fluid trapped in the chamber 42, that is to say the set point imposed by the control means 44, can be "updated" on each cycle which entails a displacement of the piston 22. The non-return valve 36 through which the mass of gas in the chamber 26 can be topped up from time to time to compensate for leaks is provided in the fixed wall 30.

In the FIG. 3 embodiment analogous structural components again carry the same reference numbers and will not all be described in detail again. This embodiment also uses a gas type elastic accumulator. It is distinguished from the previous one by the nature of the mobile walls. FIG. 3 shows only the pump and its elastic accumulator. In this embodiment the chamber 26 filled with gas is in the immediate proximity of the compression chamber 16 of the pump. In other words, the first mobile wall 22a is shared by the chambers 16 and 26. Also, the first mobile wall 22a is a deformable membrane. In practice a membrane of this kind may be made from woven synthetic fibres covered or coated with elastomer material. Said second mobile wall 32a separating the chamber 26 filled with gas from the variable volume chamber 32 is a membrane of the same kind disposed parallel to said first wall 22a. Consequently, in this embodiment the deformable part of the elastic accumulator is also between the compression chamber 16 of the pump and the variable volume chamber 42 filled with liquid. The control means 44 are similar to those from FIG. 1.

Of course, it is perfectly feasible to combine the two sorts of mobile wall described up to now, the first wall 22 being a membrane, for example, and the second wall 32 being a piston, or vice versa.

In the FIG. 4 variant the elastic accumulator essentially comprises a block 26b of elastomer material having two parallel end surfaces respectively in contact with the first and second mobile walls 22b and 32b which in the instance are in the form of free pistons adapted to move in a common bore 49. The elastomer material block 26b is therefore compressed uniaxially between the two pistons. Low hysteresis elastomer materials appropriate to this application are currently available. The general arrangement of the component parts of this variant is comparable with that from FIGS. 1 and 3, the deformable part of the elastic accumulator being located between the compression chamber 16 of the pump and the variable volume chamber 42. The block 26b comprises a concave profile lateral wall leaving an annular space 50 in the bore to enable free deformation of the elastomer block. A purge outlet 51 communicates with this annular space.

Finally, the embodiment of FIG. 5 comprises an elastic accumulator using magnetic return forces. The first mobile wall 22c closing off the compression chamber is in the form of a free piston moving in a bore 23c aligned and coaxial with the piston 13. The free piston is made from a ferromagnetic material and the bore 23c is formed in a block of insulative material such as resin. An annular groove 53 is formed in the bore 23c and accommodates a magnetic armature 54, in this instance a coil or set of coils. The magnetic field generated tends to place the piston 22c in a predetermined position, as shown in FIG. 5. If the pressure in the compression chamber 16 of the pump tends to push back the piston, a magnetically produced return force tends to oppose this displacement and consequently to return the piston to its stable equilibrium position. The excitation current in the magnetic armature is modified to vary the elasticity calibration of the elastic accumulator constituted in this way. In this device the elasticity adjustment means are therefore means for adjusting the current in an electromagnet or set of electromagnets.

The motive power unit schematically represented in FIGS. 6 and 7 will now be described. It comprises an internal combustion engine 60 incorporating at least one combustion chamber 61 in which moves a piston 62 and at least one hydrostatic transmission device 11 of the type described above and the piston 13 of which is mechanically coupled to the piston 62 of the internal combustion engine so as to be driven by it. In this embodiment the hydrostatic transmission device is of the kind described with reference to FIG. 1 and this part of the unit will not be described in detail again. Suffice to recall that the each pump 12a or 12b is included in a hydraulic circuit 15a to feed oil into a volumetric hydraulic motor 14 and that the compression chamber 16 in which the pump piston moves contains or is in permanent communication with an elastic accumulator 20. For reasons that will emerge later the motive power unit comprises four pumps 12 and in this example the volumetric motor 14 is common to all four pumps.

In this embodiment the internal combustion engine 60 is a two-stroke scavenging type engine. This particular engine is a diesel engine, but a petrol engine version is perfectly feasible. The engine 60 comprises at least one motor unit 65 made up of a cylinder 63 and a piston 62 delimiting the combustion chamber 61. The piston is a free piston, which means that it is not coupled to any crankshaft. The engine comprises two such cylinder and piston motor units 65, arranged parallel as shown in FIG. 6 or preferably four motor units arranged parallel in a barrel configuration as clearly shown in FIG. 7. In more precise terms, two such motor units 65a, 65b or 65c, 65d are coupled to an inverter mechanism 67A or 67B and to respective pumps 12a, 12b and 12c, 12d. The pair of motor units 65a, 65b is coupled by its pistons to the inverter mechanism 67A while the pair of motor units 65c, 65d is coupled to the inverter mechanism 67B. As will be seen later, the two pairs of motor units operate in phase opposition so that the whole arrangement is dynamically balanced.

For each pair of motor units the aforementioned inverter mechanism 67 comprises an inverter lever 70 pivoted at the centre about a respective rotary pivot shaft 71A, 71B perpendicular to the two free pistons 62 to which it is coupled. Each lever 70 therefore has two respective equal length arms 74a, 74b or 74c, 74d extending to either side of its central pivot point, that is to say the pivot axis of the corresponding shaft 71. The free piston(s) 62a–62d are respectively articulated to the ends of the branches 74a–74d through links 76a–76d respectively articulated between the ends of said branches and the pistons 62. Also, the piston 13 of each pump 12a–12d is mechanically coupled to a corresponding branch 74a–74d of one of the inverter levers. This articulated coupling is implemented by means of links 78a–78d or equivalent mechanisms. Each link 78a–78d is articulated at an intermediate point 79a–79d on the corresponding lever branch. The distance between this point of articulation and the pivot axis of the shaft 71A or 71B is chosen according to the respective speed ranges of the internal combustion engine and the pump(s) 12 of the hydrostatic transmission device 11.

As previously mentioned, balancing means constituting also means for synchronising the motor units are provided to maintain a relative phase difference of 180° between the functioning of the two pairs of motor units 65a, 65b and 65c, 65d, so enabling dynamic balancing of the engine and of the hydrostatic transmission device. In this instance these synchronisation means are mechanical. The coaxial and aligned pivot shafts 71A and 71B (FIG. 7) are coupled to an epicyclic gear mechanism constituting the major part of said synchronisation means. Each shaft 71A, 71B fastened to the corresponding inverter lever is coupled to a pinion gear 80A, 80B meshing with a single ring gear 82 the rotation axis of which is coincident with the axis of symmetry of the barrel arrangement of the cylinder/free piston motor units 65a–65d. In more precise terms, each pinion gear 80A, 80B is fixed to the inner end of the corresponding shaft 71A, 71B while the ring gear 82 is fixed to the end of a camshaft 83 rotating on itself about the axis of symmetry. This camshaft is parallel to the four cylinders and comprises towards its opposite end a set of cams (not visible in the figures) controlling the operating cycles of the various cylinders of the engine. In more precise terms, this camshaft 83 drives fuel injector pumps 85, oil pumps 86 and a combustion regulator 87 to be described later. The injector pumps 85 respectively feed "accumulation" type injectors 88, the operating principle of which is known. The oil pumps 86 feed actuators 90 respectively controlling the exhaust valves 92 of the engine. This type of hydraulic control is known in itself and enables the duration and the phase of the hydraulic pulse controlling each exhaust valve to be varied. It is therefore possible to advance or to retard the opening or the closing of each valve, as required. This facility combined with that of varying at will the compression and expansion ratios of the internal combustion engine (because the engine is of the free piston type) enables the engine to be adapted to all requirements for burning diesel fuel.

In the case of a petrol engine the same advantage applies, the injection of fuel which occurs after closing of the exhaust valves being performed by conventional injectors and pumps, the engine block being fitted with a sparkplug for each cylinder.

Figure 8:
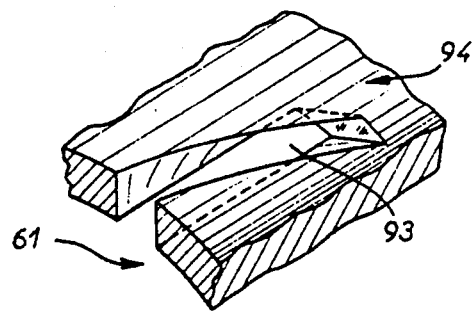
FIG. 8 is a detailed view showing the shape of the scavenging ports of the internal combustion engine from FIGS. 6 and 7.

As mentioned above, the internal combustion engine is preferably a two-stroke scavenging type engine. It therefore comprises a generally cylindrical scavenging air reservoir 94 surrounding the cylinders 63. This reservoir supplies compressed air to the combustion chambers of the various cylinders through ports 93 provided in the various cylinders. The ports of the cylinder are uncovered by the piston on each scavenging phase. Each port is the shape shown in FIG. 8. At the level of the combustion chamber 61 the orifice of the port has two parallel longitudinal edges extending along generatrices of the internal surface of the cylinder. On the other hand, at the level of the scavenging reservoir 94 the orifice of the port has two curved longitudinal edges. These are substantially parallel to those of the internal orifice on the side of the most distant end of the exhaust valves and they are progressively "inclined" up to the opposite end, while remaining parallel to each other. This "inclination" extends over a total angular sector of 30°. Thus on the exhaust stroke when the scavenging air from the reservoir 94 enters the cylinder, the air is injected partially radially and partially with a tangential component. The result of this is to inject cool scavenging air simultaneously towards the centre and towards the periphery of the cylinder. This results in improved expulsion of the burnt gases.

The air is fed into the reservoir 94 by an oscillatory scavenging air pump 96 and/or by a conventional supercharger system comprising a turbine 97 connected to an exhaust manifold (not shown) and mechanically coupled to a compressor 98. In the most complete version the compressed air outlet of the compressor is connected to the inlet 99 of the pump 96 (FIG. 7) by a known type air cooler (not shown). The outlet 100 from this pump communicates with the scavenging air reservoir 94.

Figure 9:
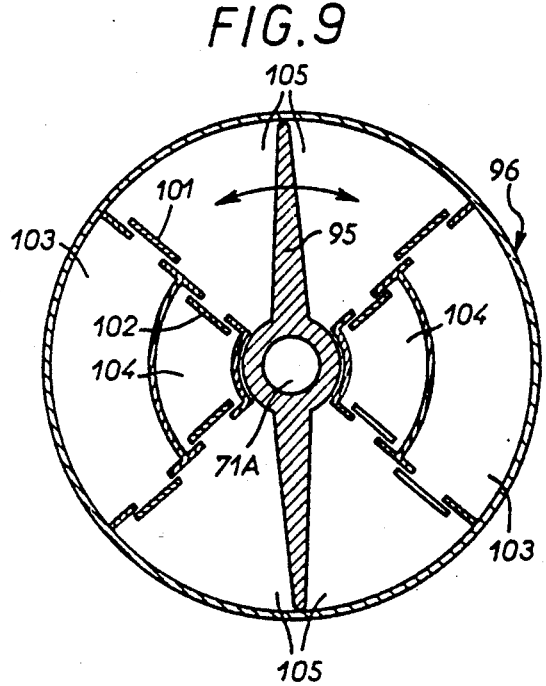
FIG. 9 is a detail schematic view showing one possible embodiment of a scavenging pump delivering compressed air for scavenging the cylinders of the two-stroke engine from FIGS. 6 and 7.

In this case the pump 96 constitutes a second compression stage and comprises a twin-vane rotor assembly 95 mounted at the end of one of the shafts (in this instance the shaft 71A) of an inverter lever 70. In the FIG. 9 embodiment the pump 96 is divided into multiple compartments communicating with each other through inlet valves 101 and outlet valves 102. The inlet 99 communicates with two inlet compartments 103 symmetrically disposed relative to the rotation axis of the rotor and the outlet 100 communicates with two outlet compartments 104, also symmetrical relative to this axis. These four compartments are circumscribed by radial walls carrying the valves 101 and 102. The rotor 95 operates within two compression chambers 105 symmetrically disposed relative to the axis. The rotor divides these compression chambers into four variable volume volumetric capacities. The rotors driven by the shaft 71A oscillate in the compression chambers 105. The operation of the pump is evident from the above description.

The pump is particularly effective on starting and when idling. Nevertheless, it is sufficient for a small engine capacity, moderate performance vehicle. For improved performance, and especially for heavy goods vehicles, a cascade arrangement of the supercharger compressor and the pump will generally be preferred. In this case another air cooler may be envisaged downstream of the pump. The supply of scavenging air is therefore more secure at all engine speeds and starting is easier.

Figure 6:
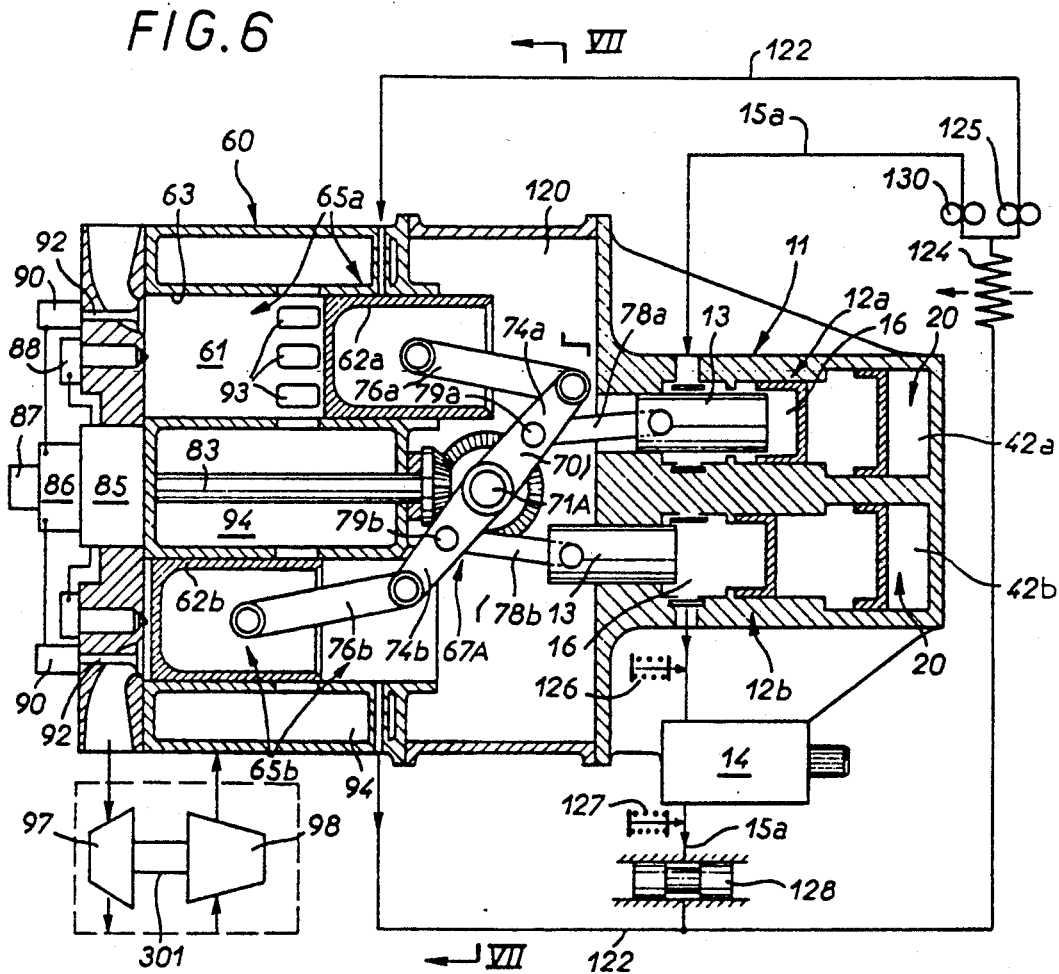
FIG. 6 is a schematic general view of a motive power unit in accordance with the invention comprising in particular a hydrostatic transmission device of the kind shown in FIG. 1.
Figure 7:
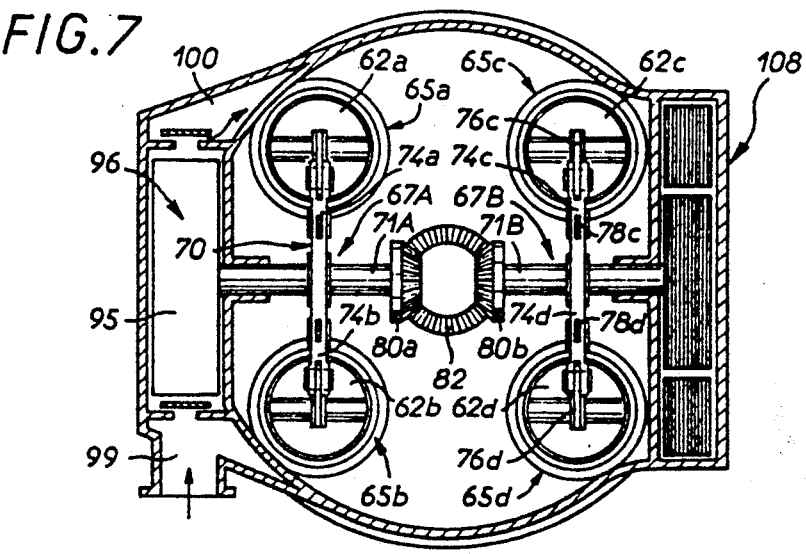
FIG. 7 is a schematic representation of the same motive power unit seen transversely at the level of the connecting rods of the internal combustion engine, in cross-section on the line VII—VII in FIG. 6.
Figure 10:
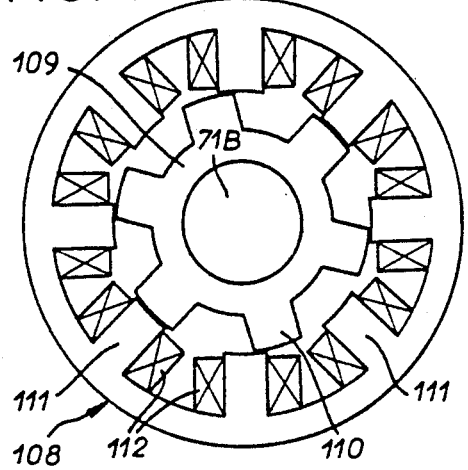
FIG. 10 is a schematic detail view showing one possible embodiment of an oscillatory starter-generator.

The motive power unit of FIGS. 6 and 7 is also equipped with an oscillatory motion electric starter 108 shown in FIG. 10. The rotor of this device is coupled to the shaft of one of the aforementioned inverter levers, in this instance the shaft 71B, with the result that the pump and the starter are coaxial and disposed to either side of the engine block. After the engine is started the device is switched to function as a generator. The rotor 109 is fixed to the end of the shaft 71B and driven by the latter. The starter functions according to the "variable reluctance" principle. Constructed from laminated sheet metal, the rotor 109 comprises six poles 110 regularly distributed in the circumferential direction and the stator, also of laminated construction, comprises eight poles 111 also regularly distributed in the circumferential direction, each pole of the stator carrying a coil 112. Of course, the numbers of poles on the rotor and the stator could be different. A version with 12 poles on the rotor and 16 poles on the stator offers higher performance (increased torque and reduced magnetic losses) all other things being equal. One pair or multiple pairs of poles may be energised simultaneously, as appropriate.

As clearly seen in FIG. 6, the internal combustion engine 60 and the hydrostatic transmission system 11, and in this instance the hydraulic motor 14, are grouped to constitute a single unit. This makes it possible in particular to simplify the cylinder cooling circuit and to combine it with the main circuit 15a established between the pumps 12 and the motor 14. Thus an oil circuit 122 is established between an inlet and an outlet of the cylinder cooling circuit. It comprises in succession a cooling radiator 124 and a circulation pump 125. The main circuit 15a between the pumps 12 and the motor 14 further comprises (starting from a pump outlet manifold) a safety valve 126, the motor 14, a safety valve 127, an isolating spool valve 128, the cooling device 124 and a supercharger pump 130 (separate to the pump 125) feeding the oil to the inlet valves of the pumps 12. The cooling flowrate is therefore independent of the flowrate of the hydrostatic transmission device. The safety valve 126 is calibrated to hold the pressure below a selected maximum value. The safety valve 127 connected to the low-pressure outlet of the hydraulic motor 14 holds the pressure below a maximum value chosen (in the case of an automobile vehicle) for good grip between the wheels and the ground while the progressive isolating spool valve 128 closes on braking or when stopped.

The mechanical assembly comprising the inverter levers, the epicyclic gear mechanism and the links attached to the pistons of the internal combustion engine and to the pistons of the pumps is accommodated in a cooling chamber 120 situated between the heat engine assembly and the pump assembly. It is fed with oil different from that in the main circuit by a pump not shown here.

Figure 11B:
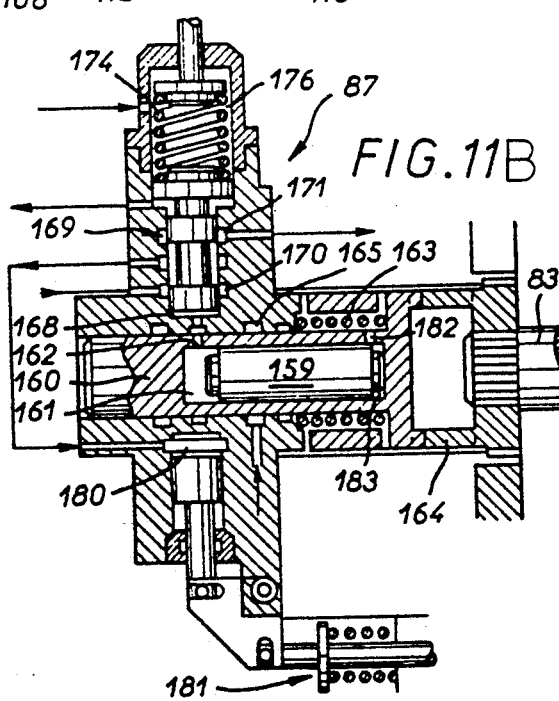
FIG. 11B is a schematic view of a "fast" regulation system for varying at the same time the elasticity of the elastic accumulator and the quantity of fuel fed into the internal combustion engine.
Figure 11A:
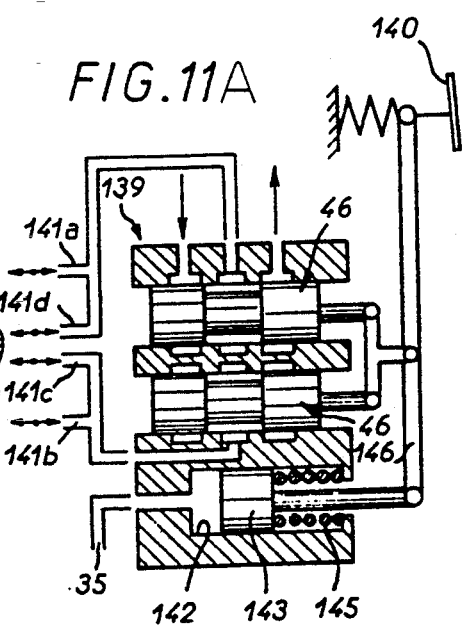
FIG. 11 is a schematic view of a regulation system for varying at the same time the elasticity of the elastic accumulator and the quantity of fuel fed into the internal combustion engine.

FIGS. 11A and 11B show motive power unit regulator systems that are remarkably simple. It is well adapted to use on an automobile vehicle. FIG. 11A shows a so-called "slow" subsystem 139 coupled to the accelerator pedal 140 and FIG. 11B shows a "fast" subsystem consisting of the previously mentioned combustion regulator 87.

The accelerator pedal 140 is mechanically coupled to at least a spool valve 46 as described with reference to FIG. 1 and which enables the pressure in the chambers 26 of the elastic accumulators to be adjusted. Here there are two spool valves 46 in parallel, one feeding the variable volume chambers 42a and 42b (corresponding to the combinations 65a, 65b) which are synchronised by the passages 141a and 141d and the other feeding the chambers 42b and 42c (corresponding to the combinations 65c, 65d) which are synchronised by the passages 141b and 141c. The passage 35 described above is connected to a bore 142 containing a correction piston 143 coupled to the accelerator pedal 140. This piston operates against a calibrated spring 145. When the pressure in the elastic accumulators 26 has reached the required value it is operative via the passage 35 common to all the elastic accumulators on the correction piston 143 and via the lever 146 returns the spool valve 46 to the median position, which cancels out the adjustment oil flow to the chambers 42. There is therefore no loss of energy outside variations in charge. During deceleration the system functions in the converse way to that described above and leading to discharge of adjustment oil fed to the spool valve 46.

The combustion regulator 87 further comprises a hollow piston 160 filled with oil and having an internal cavity 161 accommodating a counterweight 159. The piston 160 moves in a bore coaxial with and aligned with the cam shaft 83. The piston 160 is urged towards the camshaft by a spring 163 bearing against a shoulder on piston. The camshaft comprises at its end a cylindrical cam 164 coupled by shaped linkages (with ramps) to the piston 160. The coupling is such that the oscillatory rotary movement of the camshaft communicates to the piston 160 a reciprocating linear motion representative of that of the piston 62 of the internal combustion engine. The piston 160 is therefore subjected to accelerations and decelerations proportional to those of the pistons of the engine. These accelerations and decelerations are therefore an indication of the combustion pressure.

The internal cavity 161 of the piston 160 can communicate through a lateral orifice 162 with an oil feed groove 165 when the spring 163 is relaxed. The same cavity 161 can communicate through the orifice 162 with the bore 168 of a control spool valve 169 comprising two shoulders respectively commanding the opening and the closing of two grooves 170 and 171 in the bore 168. The groove 170 is towards the end of the spool valve which communicates with the cavity 161 and distributes oil under pressure; it cooperates with one of the shoulders on the spool valve. The groove 171 cooperates with the other shoulder on the spool valve and is connected to a hydraulic tank. A spring 174 bears against the other end of the spool valve 169. It therefore urges spool valve in a direction tending to uncover the groove 170. The spring is placed in a cavity 176 receiving oil or compressed air. The pressure of the oil or the air is representative of the supercharging pressure of the internal combustion engine.

The median part of the bore 168 between the two shoulders, that is to say the hydraulic outlet from the spool valve, is coupled to the chamber of a ram 180. The piston of this ram is coupled to a mechanism 181 controlling fuel injection pumps. An orifice 182 serves to drain completely the cavity 183 to avoid discharging the counterweight 159 into the piston 160. Operation is as follows:

Assume that the driver wishes to increase the speed of the vehicle. Operation of the accelerator pedal 140 results in an increasing stiffness of the elastic accumulators 20 associated with the various pumps. As a consequence of this the cumulative flowrate in the elastic accumulators is lower and the flowrate in the hydraulic motor increases. However, the elastic accumulators return less energy and the compression of the engine tends to decrease during subsequent cycles, as the engine is of the free piston type. It is therefore necessary to re-introduce energy into the system by increasing the quantity of fuel injected. The regulator 87 secures this automatically.

The acceleration of the camshaft 83 is proportional to the acceleration of the pistons of the internal combustion engine. Consequently, the piston 160 behaves like the pistons 63 of the internal combustion engine, with the same variations in acceleration. Because of its inertia, however, the counterweight 159 tends to remain immobile within the piston 160. This counterweight therefore imparts to the oil trapped in the cavity 161 variations in pressure representative of those of the pistons of the internal combustion engine. These pressure variations affect the position of the spool valve 169 which controls the flowrate of the fuel injection pumps. As previously mentioned, the pressure set point applied to the spool valve by virtue of the calibration of the spring 174 also allows for the supercharging pressure.

Figure 12A:
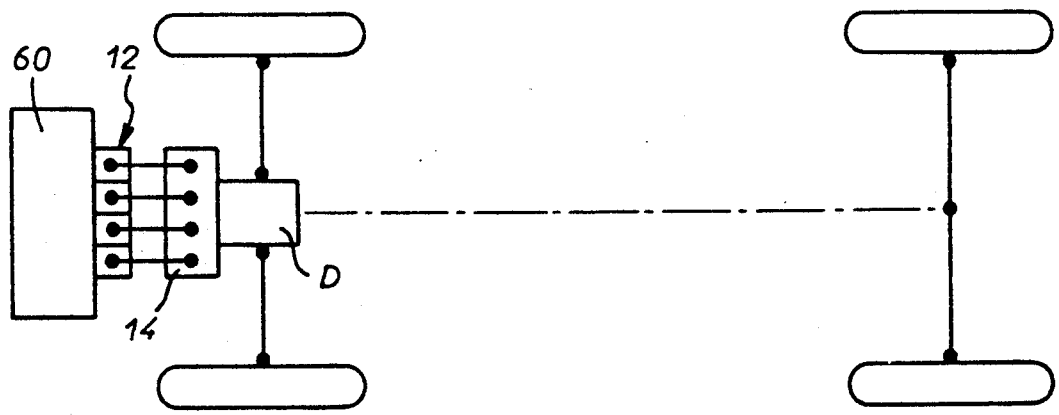
FIG. 12a is a schematic showing a possible location for the motive power unit in accordance with the invention on an automobile.
Figure 12B:
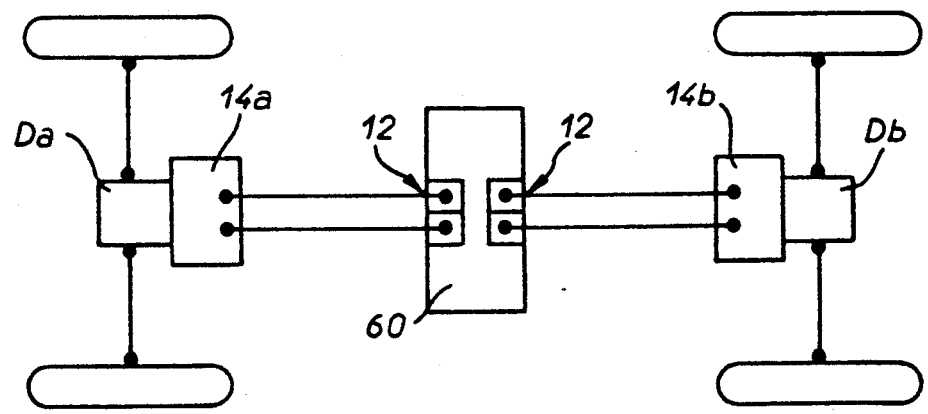
FIG. 12b is a schematic showing another possible location for the motive power unit in accordance with the invention on an automobile.
Figure 12C:
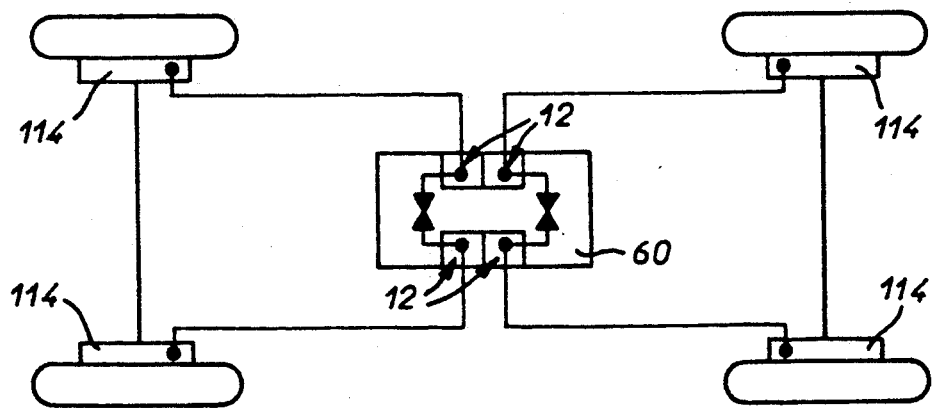
FIGS. 12C is a schematic showing yet another possible location for the motive power unit in accordance with the invention on an automobile vehicle.

FIG. 12a, 12b and 12c show various location possibilities for a motive power unit in accordance with the invention. In FIG. 12a the motive power unit is typically that which has just been described, in other words comprising a four-cylinder internal combustion engine 60 driving four pumps. These pumps feed a single hydraulic motor 14 which drives mechanically a differential D coupled to the front or rear wheels. The four hydraulic pumps 12 therefore feed the hydraulic motor 14 in parallel. The result is a very compact assembly for front wheel or rear wheel drive.

In FIG. 12b the four pumps are divided into two groups each of two pumps with a relative phase difference of 180°, a and b on the one hand, c and d on the other hand. Each group of pumps feeds a hydraulic motor 14a or 14b. The motor 14a is coupled to the front wheels by a differential Da and the motor 14b is coupled to the rear wheels by a differential Db. This produces a four wheel drive vehicle having the same characteristics on both power drives. By operating differently on the elastic accumulators of the front and rear pumps it would be possible to modulate at will the pressures and therefore the torques of the front and rear wheels. It does not matter whether the engine is at the front, at the rear or in a central position as shown.

FIG. 12c shows another embodiment in which each pump 12 feeds separately a known type hydraulic motor 114 incorporated into each wheel. The differential effect between the front wheels on the one hand and the rear wheels on the other hand is achieved by hydraulic communication between the front pumps on the one hand and the rear pumps on the other hand. These communications Ca, Cb are either of limited constant aperture or of proportional aperture controlled by the steering of the vehicle.

Figure 13:
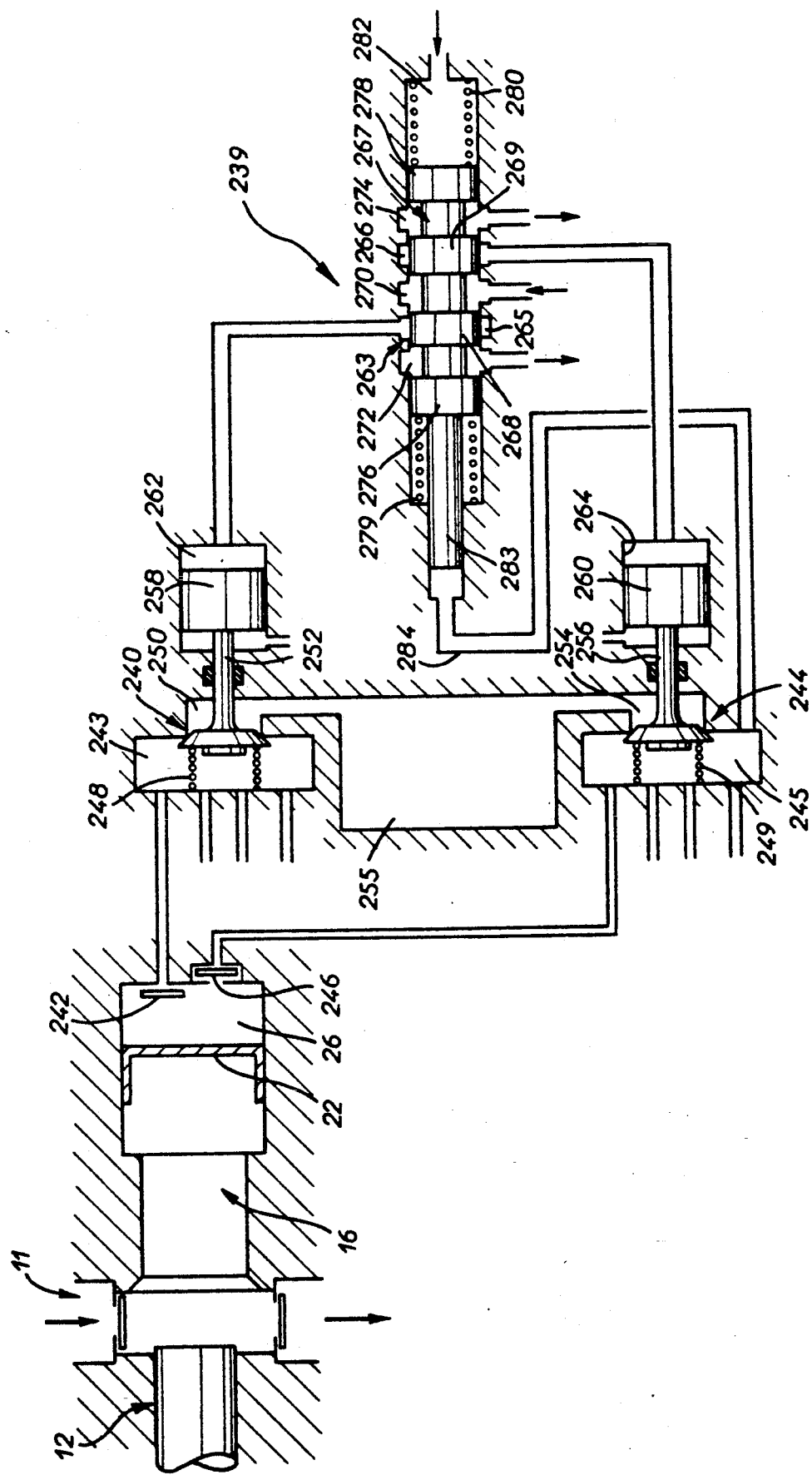
FIG. 13 shows a pneumatically controlled variant of the elastic accumulator.

FIG. 13 shows a variant in which the elastic accumulator is controlled in a simpler and faster way. In this variant the variable volume chamber 42 from FIGS. 1 through 3 is eliminated in favour of direct action on the charging of the gas in the chamber 26 defining accumulator.

FIG. 13 shows only one pump 12 coupled to its elastic accumulator. The stiffness of the latter is controlled by a hydropneumatic control system 239 designed to replace the subsystem 139 from FIG. 11A. The control system 239 is therefore coupled to an accelerator pedal and controls numerous elastic accumulators in parallel, for example four chambers 26 in the case where the engine is equipped with four mobile assemblies (FIGS. 6 and 7) operating four pumps 12 respectively coupled to the four chambers 26 forming said elastic accumulators. Each chamber 26 is connected to a charge valve 240 by a charge non-return valve 242 and to a discharge valve 244 by a discharge non-return valve 246. The two valves 240, 241 are urged towards their respective valve seats by respective springs 248, 249. The pipes connecting the valves 242 to the valve 240 discharge into a chamber 243 enclosing the spring 248. The pipes connecting the valves 246 to the valve 244 discharge into a chamber 245 enclosing the spring 249. On the other side of the seat of the valve 240 relative to the spring is an annular chamber 250 through which passes the valve stem 252 coupled to a piston 258 moving in a bore 262. Similarly, on the other side of the valve seat 244 relative to the corresponding spring is an annular chamber 254 through which passes the valve stem 256 coupled to a piston 260 moving in a bore 264. The two chambers 250 and 254 communicate directly with a pressurised gas reservoir 255. In this instance the gas is nitrogen at 120 bars. The springs 248, 249 have sufficient force to overcome the force developed on the valves by the pressurised gas and to hold said valves closed when the system is not loaded. Under these conditions the quantity of gas trapped in the elastic accumulator or each elastic accumulator remains constant. The two pistons 258, 260 are operated by pressurised hydraulic fluid fed to the respective chambers of the bores 262, 264 to open the corresponding valves. The two bores 262, 264 are therefore respectively connected to two grooves 265, 266 of a distributor 263 with a spool valve 267. The two grooves 265, 266 are variably closed off by respective control bearing surfaces 268, 269 on the spool valve delimiting a high-pressure chamber 270 connected to a high-pressure hydraulic supply and situated between the two grooves 265, 266. Discharge chambers 272, 274 connected to a hydraulic tank are respectively defined between the control bearing surfaces 268, 269 of the spool valve and respective end bearing surfaces 276, 278 of the spool valve. The valve is held in the idle position by opposing springs 279, 280. The end bearing surface 278 moves in a chamber 282 connected to a hydraulic master cylinder coupled to the accelerator pedal (not shown). This chamber therefore receives a control pressure determined by the user. The end bearing surface 276 is extended by a piston 283 of smaller cross-section exposed at its end to the pressure in the chamber 245 (pipe 284) between the valves and the valve. This pressure is therefore representative of the minimum pressure in the elastic accumulators associated with the pumps, that is to say the pressure when the piston of the pump is at its neutral aspiration point. The operation is as follows.

The supply to the chambers 26 of the elastic accumulators is controlled by the spool valve 263 which controls the two valves 240, 244. The control oil feed to the chamber 270 is taken upstream of the hydraulic motor 14. The spool valve 267 is moved according to the pressures applied, on the one hand, to the chamber 282 in response to the action of the operator and, on the other hand, to the end of the piston 283. If the operator wishes to increase the power, he presses the accelerator and the oil pressure in the chamber 282 becomes predominant. The spool valve moves in a direction causing the valve 240 to open and the valve 244 to close. The charge non-return valves 242 open, which enables charging of the elastic accumulators from a given point in the cycle of the corresponding pumps, until equilibrium is re-established. From this time the valve 240 remains closed. The elastic accumulators 24 are then charged to a new pressure. If the operator wishes to reduce the power he reduces the pressure in the chamber 282 which results in a movement of the spool valve 267 in the other direction. The valve 244 opens and the valve 220 closes. The discharge non-return valves 246 open from a given point in the cycles of the corresponding pumps to discharge the elastic accumulators until equilibrium is re-established. The regulatory action is very fast because approximately five cycles are sufficient to charge or discharge completely the elastic accumulators. This represents a delay of only approximately 0.15 second. As the regulation delay of the fuel setting (see description with reference to FIG. 11) is in the same order of magnitude, a maximum time of 0.3 second to reach full torque is feasible.

Figure 14A:
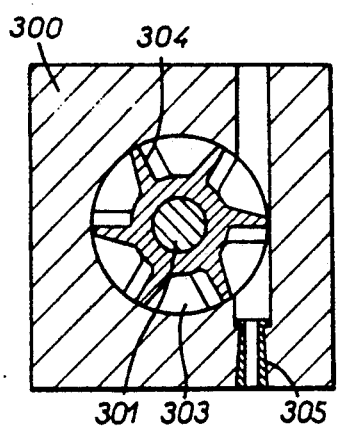
Figure 14B:
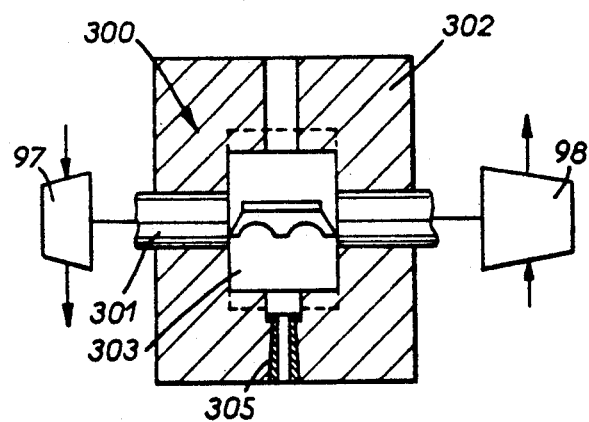

As emerges from the above description with reference to FIG. 7 the reciprocating starter motor 108 is used both to actuate the pistons of the internal combustion engine on starting and to drive the scavenging pump 96 with a reciprocating movement, especially beneficial on starting and when idling. The improvements shown in FIGS. 14 and 15 make it possible to dispense with the scavenging pump (transferring this role in its entirety to the compressor 98) and with the starter motor 108. To this end a hydraulic turbine 300 (FIGS. 14a, 14b) is coupled directly to the shaft 301 which drives the compressor 98, to be more precise the shaft connecting the turbine 97 and the compressor. The shaft 301 is mounted in a bore in a frame or support 302 within which is defined a cavity 303 containing the rotor 304 of the turbine, which is mounted on and fixed to the shaft 301. A nozzle 305 discharging into said cavity is oriented towards the vanes of the rotor. The nozzle 305 is supplied with hydraulic fluid by a pump 306 (see FIG. 15), for example a gear type pump, via a non-return valve 307. The pump is rotated by a conventional electric motor 308, meaning one that rotates continuously and not in a reciprocating way as previously. This solves the problem of supplying air to the scavenging chamber 94 at any speed, as well as on starting, by means of the compressor 98 alone.

Figure 15:
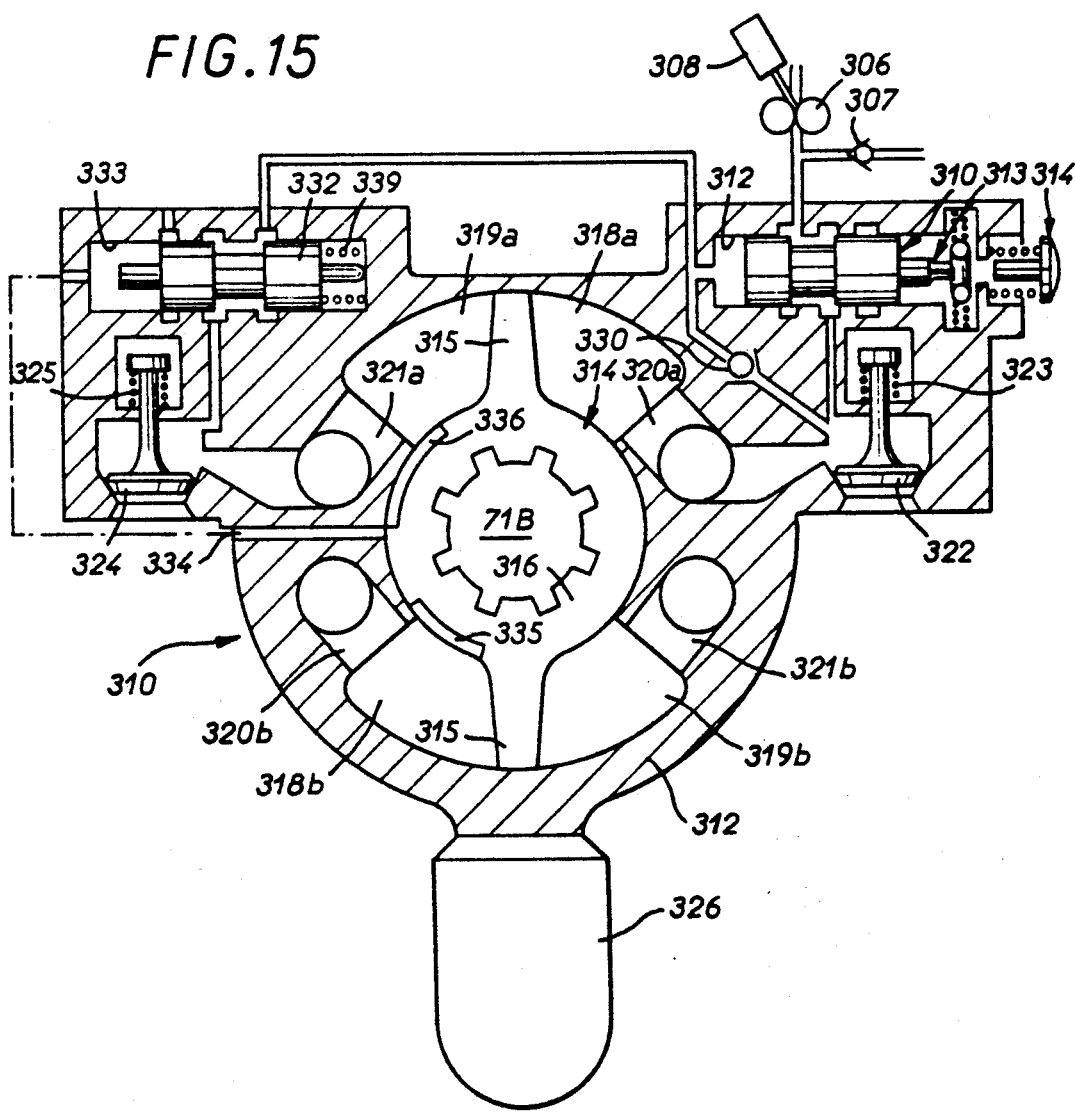
FIG. 15 shows a hydraulic starter.

Starting is achieved by the same pump 306 driven by the electric motor, using a hydraulic starter as shown in FIG. 15. This device is coupled to one of the shafts 71A, 71B visible in FIG. 7. It derives from the energy of the pump 306 an oscillatory rotational movement for starting the internal combustion engine. The starter 310 includes a casing 312 into which is inserted one end of the oscillatory rotary shaft 71B (for example) of the inverter mechanism visible in FIGS. 6 and 7.

The casing 312 defines a cavity with cylindrical and radial walls within which is a rotor 314 with two oppositely situated vanes 315. The rotor is mounted on the shaft 71B and constrained to rotate with it by splines. The rotor 314 includes a cylindrical hub 316 coaxial with the shaft 71B and mounted to rotate in a sealed way between two small diameter cylindrical bearing surfaces of said cavity. The rotor 314 has the opposite ends of its vanes in contact with large-diameter cylindrical bearing surfaces of the same cavity, so that they divide the cavity into four chambers 318a, 318b and 319a, 319b symmetrical in pairs to the rotation axis of the shaft 71B. Pipes 320a, 320b interconnected by a connection that is not visible in the drawing respectively discharge into the two chambers 318a, 318b on radial walls of the cavity. The two chambers 318a, 318b are therefore in permanent communication. Likewise, interconnected pipes 321a, 321b respectively discharge into the two chambers 319a, 319b on other radial walls of the same cavity. The chambers 319a, 319b are therefore in permanent communication. The range of angular movement of the twin-vane rotor within the cavity is 90°. The two chambers 318a, 318b communicate with a first discharge valve 322 urged towards its open position by a spring 323. When this valve is open it establishes communication with a hydraulic tank. Similarly, the two chambers 319a, 319b communicate with a second discharge valve 324 of a similar kind urged towards its open position by a spring 325. The two chambers 318a, 318b are further connected to the pump 306 via a first spool valve 310 sliding in a bore 312. This spool valve is designed to assume one of two predetermined positions (establishing or interrupting communication between said pump and the chambers 318) by means of an arrangement of two ball grooves 313. One end of the spool valve faces an operating member 314 such as a pushbutton or the like. Operating the latter moves the spool valve in a direction tending to establish communication between the pump 306 and the two chambers 318a, 318b. The other two chambers 319a, 319b are connected (via the pipes 321a, 321b) to a hydraulic accumulator 326 fixed to the casing. The connection between said pipes and said accumulator is not visible in the drawings.

The chambers 319a, 319b are also connected to the "outlet" of said first spool valve by a hydraulic circuit comprising a non-return valve 330 calibrated to a pressure of approximately 20 bars and a second spool valve 332 moving in a bore 333. The second spool valve is urged towards its "closed" position by a spring 334 bearing on one of its ends. The other end of the spool valve 332 moves in a part of the bore 33 communicating with a pipe 334. The latter is adapted to be placed in communication with one or other of the pairs of chambers 318, 319 via respective grooves 335, 336 in the hub 316 of the rotor 314. Also, the end of the spool valve 310 opposite that which cooperates with the operating member 314 moves in a part of the bore 312 in communication with the outlet from the non-return valve 330.

Operation is as follows: the pump 306 is driven by its electric motor and feeds pressurised oil to the spool valve 310. When the operating member 314 is pressed the spool valve 310 is moved and the pressurised oil, flowing around the valve 322, pushes it back against its seat. The oil then enters the two chambers 318, which rotates the rotor and the shaft 71B until the groove 336, having described approximately one quarter-turn, enters the chamber 318b. The pressurised oil then pushes the spool valve 332 back to the open position. From this time on the oil passes through the non-return valve 330 and through the spool valve 332 and closes the valve 323. Pressure is established in the chambers 319 and compresses the accumulator 326. During the compression of the accumulator the pressure in the chambers 319 remains lower than that in the chambers 318 because of the calibration of the non-return valve 330. The rotor 314 therefore remains in place until the increasing pressure in the bore 312 pushes back the spool valve 310 to open the valve 322. The latter then exposes a large leakage cross-section which discharges the chambers 318 without resistance to the flow. The rotor 314 therefore turns in the opposite direction due to the action of the accumulator 326. The engine starts. The groove 335 then establishes communication with the pipe 334, which enables the spool valve 332 to return to its original position, due to the effect of the springs 339. All the components are therefore in the same position as at the beginning of the starting cycle. If the internal combustion engine fails to start correctly, the operating member 314 can therefore be pressed again to initiate a new starting cycle.

We claim:

1. A motive power unit comprising an internal combustion engine and a hydrostatic transmission device mechanically coupled to said engine to be driven thereby, said hydraulic transmission device including, in a hydraulic fluid circulation circuit:
   at least one hydraulic pump having a compression chamber and a piston driven in a bore in communication with said compression chamber, said compression chamber comprising inlet valve means for controlling inflow of said hydraulic fluid in said compression chamber and outlet valve means for controlling outflow of said hydraulic fluid from said compression chamber, said piston being driven by said internal combustion engine, a hydraulic volumetric motor connected to said outlet valve means of said compression chamber, and wherein an elastic accumulator communicates with said compression chamber of said pump between said inlet valve means and said outlet valve means, said hydrostatic transmission device also including means for adjusting elasticity of said elastic accumulator.

2. Motive power unit according to claim 1, wherein said internal combustion engine is a two-stroke scavenging type engine.

3. Motive power unit according to claim 1, wherein said internal combustion engine is equipped with at least one motor unit comprising a cylinder and drive piston defining a combustion chamber therebetween.

4. Motive power unit according to claim 3, comprising at least two motor units each having a cylinder and drive piston and wherein each said drive piston of said set is coupled to an inverter mechanism and to a respective one of said pumps.

5. Motive power unit according to claim 4, wherein the inverter mechanism comprises an inverter lever mounted to pivot at its centre about a shaft perpendicular to said motor units drive pistons, said lever therefore comprising two equal branches, one on each side of a median pivot point of said inverter lever, and wherein said drive pistons are respectively articulated to ends of said branches.

6. Motive power unit according to claim 5, wherein the piston of each pump is mechanically coupled to a corresponding branch of said inverter lever by means of a link articulated to an intermediate point on said branch.

7. Motive power unit according to claim 4, comprising four motor units each having cylinder and drive piston disposed in a barrel arrangement and coupled in pairs to respective ones of two of said inverter mechanisms and balancing and synchronisation means for maintaining said two pairs of motor units in phase opposition.

8. Motive power unit according to claim 7, wherein said balancing and synchronisation means comprise a mechanism having pinion gears and a ring gear, each pivot shaft of an inverted lever, fixed to the latter, being coupled to one of said pinion gears meshing with a ring gear pivoting about an axis of symmetry of said barrel arrangement of said cylinder and drive piston motor units.

9. Motive power unit according to claim 8, wherein said ring gear is fixed to a rotary shaft and wherein said shaft is a camshaft for controlling operating cycles of said combustion chambers.

10. Motive power unit according to claim 4, comprising ports formed in said cylinders and, a scavenging air reservoir arranged to supply said combustion chambers through said ports.

11. Motive power unit according to claim 10, wherein said reservoir is connected to an oscillatory scavenging air pump driven by said shaft of said invention lever.

12. Motive power unit according to claim 10, wherein each of said ports comprises an internal orifice provided with straight longitudinal edges parallel to a generatrix of the combustion chamber and an external orifice with longitudinal edges at an angle to said generatrix.

13. Motive power unit according to claim 6, wherein an alternating oscillatory motion electric starter is coupled to the shaft of said inverter lever.

14. Motive power unit according to claim 1, wherein said elastic accumulator comprises a first mobile wall forming part of said compression chamber of the pump.

15. Motive power unit according to claim 14, wherein said elastic accumulator comprises a chamber filled with a gas.

16. Motive power unit according to claim 1, wherein said elastic accumulator comprises a block of elastomer material.

17. Motive power unit according to claim 14, wherein said first mobile wall comprises a piston made from a ferromagnetic material and adapted to cooperate with a fixed magnetic armature.

18. Motive power unit according to claim 14, wherein said elasticity adjustment means comprises a variable volume chamber filled with an incompressible fluid, a second mobile wall adapted to separate a deformable part of said elastic accumulator from said variable volume chamber, and control means for adjusting the quantity of incompressible fluid in said variable volume chamber.

19. Motive power unit according to claim 18, wherein at least one of said first and second mobile walls is a deformable membrane.

20. Motive power unit according to claim 18, wherein at least one of said first and second mobile walls is a free piston disposed in a corresponding bore.

21. Motive power unit according to claim 18, wherein said variable volume chamber is between said deformable part of said elastic accumulator and said compression chamber of the pump.

22. Motive power unit according to claim 18, wherein said deformable part of said elastic accumulator is between said compression chamber of the pump and said variables volume chamber.

23. Motive power unit according to claim 15, wherein the chamber filled with gas is connected to a pressurized gas reservoir, a selectively operated charge valve and a charge non-return valve, as well as a selectively operated discharge valve and a discharge non-return valve, connect said chamber filled with gas and said pressurized gas reservoir.

24. Motive power unit according to claim 23, wherein the charge and discharge valves comprise respective spring means for urging said charge and discharge valves towards a closed position and are hydraulically coupled to a control spool valve, said control spool valve is adapted to control said charge and discharge valves in response to an operator control input and the minimum pressure in said chamber filled with gas.

25. Motive power unit according to claim 10, comprising an alternating rotary motion hydraulically operated starter coupled to one of said inverter mechanism.

26. Motive power unit according to claim 25, wherein said starter comprises a cavity which receives an oscillatory rotary shaft of said inverter mechanism and a twin-vane rotor mounted on said oscillatory rotary shaft, wherein said rotor and said cavity define four chambers, and pairs of said chambers which are opposite relative to an axis of rotation of said oscillatory rotary shaft being in fluid communication, wherein a first of said pairs of chambers is connected to a hydraulic fluid feed pump through a first discharge valve and a first spool valve, and a second of said pairs of chambers is connected to to an accumulator through a second discharge valve.

27. Motive power unit according to claim 26, wherein said second pair of chambers is connected to said first spool valve through a hydraulic circuit comprising a calibrated non-return valve and a second spool valve.

28. Motive power unit according to claim 27, wherein said first spool valve has a first end facing an operating member and a second end in fluid communication with said non-return valve, said second spool valve is urged towards a closed position by a spring bearing on its first end and a second end of said second spool a valve is in fluid communication with one of the pairs of chambers through sets of grooves formed in a cylindrical hub of said twin-vane rotor.

29. Motive power unit according to claim 2, comprising a scavenging air reservoir connected to a compressor, said compressor is connected to a hydraulic turbine, and said hydraulic turbine is connected to a pump.

30. Motive power unit according to claim 9 comprising a regulator with a hollow piston coupled to said camshaft to be subjected to acceleration and decelerations of each piston of said internal combustion engine, said hollow piston including a cavity filled with liquid and means to impart to said liquid in said cavity a pressure representative of said accelerations and decelerations, said regulator also comprising means for adjusting the quantity of fuel supplied to said engine coupled to said cavity to be controlled by said pressure of said liquid.

31. In an automobile vehicle comprising at least one drive wheel, a motive power unit comprising an internal combustion engine and a hydrostatic transmission device mechanically coupled to said engine to be driven thereby, said hydrostatic transmission device including, in a hydraulic fluid circulation circuit;
- at least one hydraulic pump having a compression chamber and a piston driven in a bore in communication with said compression chamber, said compression chamber comprising inlet valve means for controlling inflow of said hydraulic fluid in said compression chamber and outlet valve means for controlling outflow of said hydraulic fluid from said compression chamber, said piston being driven by said internal combustion engine,
- a hydraulic volumetric motor connected to said outlet valve means of said compression chamber, said motor being equipped with a rotative power shaft mechanically coupled to said drive wheel, and wherein an elastic accumulator communicates with said compression chamber of said pump between said inlet valve means and said outlet valve means, said hydrostatic transmission device also including means for adjusting elasticity of said elastic accumulator.

32. Motive power unit according to claim 31, comprising a first volumetric motor coupled to a first set of drive wheels and a second volumetric motor coupled to a second set of drive wheels, each of said volumetric motors is coupled to two of said hydraulic pumps.

33. Automobile vehicle according to claim 31, wherein the motive power unit comprises four volumetric motors integrated into respective driving wheels.

* * * * *